Patented Nov. 12, 1940

2,221,127

UNITED STATES PATENT OFFICE 2,221,127

TEMPERATURE CONTROL MEANS FOR GEAR CUTTING

Harry H. Bates, Ridley Park, Pa., assignor to Westinghouse Electric & Manufacturing Company, East Pittsburgh, Pa., a corporation of Pennsylvania Application July 27, 1938, Serial No. 221,646

3 Claims. (Cl. 90—1)

My invention relates to machine tools, such as gear hobbers, and it has for an object to provide, in connection with apparatus of this character, means for keeping the ambient air within narrow limits of temperature variation in order to avoid the introduction of errors into the work due to expansion and contraction effects.

A further object of my invention is to provide an apparatus including an enclosure, a heater, a cooler and a thermostat for controlling the heater and cooler to keep the air temperature within the enclosure within narrow limits of variation.

In the finish cutting of large gears, such as the marine reduction type, the finish cutting may require twenty-four hours or longer, and it is customary practice, once cutting is started, to continue without interruption until finish cutting is completed. As the ambient air undergoes considerable temperature variation during finish-cutting periods of many hours duration, the temperature of the hobbing machine and the gear blank also undergo temperature changes, which are responsible for expansion and contraction effects, with the result that errors are introduced into the gear being cut. Accordingly, I provide an enclosure for the hobbing machine together with means for maintaining the temperature of air therein within narrow limits of variation in order that greater accuracy may be preserved in a gear being cut.

A further object of my invention is to provide an enclosure for a gear hobbing machine together with a heater and cooler therein and controlled by a thermostat for maintaining the air within the enclosure within narrow limits of temperature variation.

A further object of my invention is to provide, in apparatus including an enclosure, a heater and a cooler arranged within the enclosure, the cooler discharging cooled air into the upper portion of the enclosure and the heater discharging warm air in the lower portion of the enclosure together with a thermostat controlling the heater and the cooler so that one or the other thereof is in operation continuously to keep the air throughout the volume of the enclosure within narrow limits of temperature variation.

A further object of my invention is to provide, in connection with an enclosure for a gear hobber, the enclosure having its walls spaced suitable distances from the gear hobber, a heater and a cooler arranged near to the floor and adjacent to one wall of the enclosure, the cooler having its discharge directed upwardly and the heater having a fan for discharging heated air adjacent to one wall of the enclosure and horizontally out of contact with the hobber together with a thermostat arranged adjacent to the wall of the enclosure opposite to said first wall thereof, the thermostat being responsive to decline in temperature to a predetermined extent to start the heater and to stop the cooler and being responsive to rise in temperature of the portion of the air within the enclosure adjacent to the thermostat to stop the heater, whereby the temperature of the air within the enclosure is raised in increments without having to raise the entire volume of air therein to the required temperature with the result that not only are variations in temperature of the total volume of air within the enclosure kept within a narrow range but relative temperature differences throughout the volume are minimized.

A further object of my invention is to provide, in connection with a gear hobbing machine and an enclosure therefor, the machine having relatively large heat inertia as compared with the air within the enclosure, a heater and cooler for the enclosure air, together with means including a thermostat for controlling the heater and cooler such that, when the heater is in operation the cooler is idle and vice versa, in order to keep the air temperature within a narrow range of variation and to effect such frequency of temperature change of the air within the regulating range that, on account of the relatively larger heat inertia of the machine as compared with the air, negligible change in temperature of the machine occurs.

These and other objects are effected by my invention as will be apparent from the following description and claims taken in connection with the accompanying drawings forming a part of this application, in which:

Figure 1:
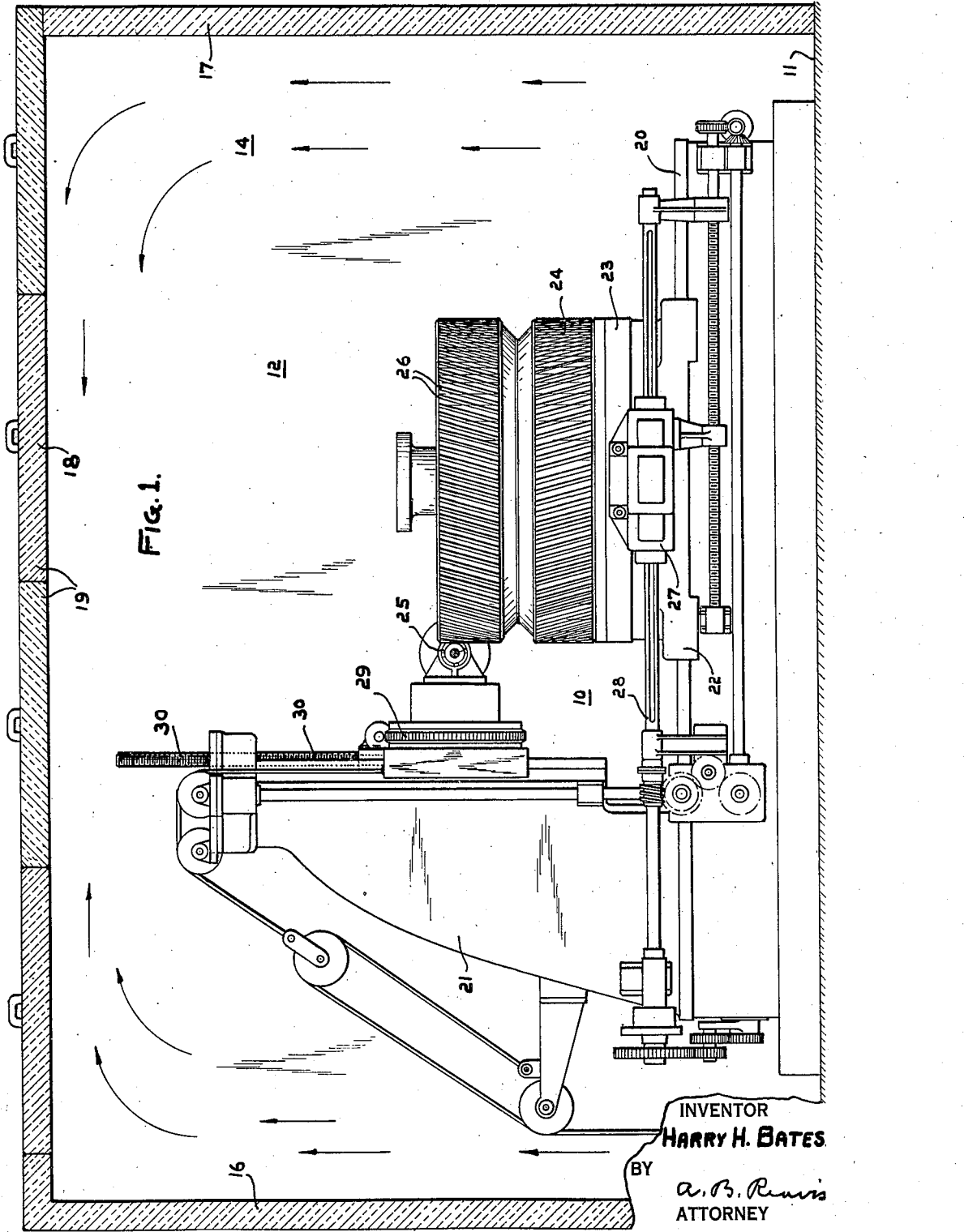
Fig. 1 is a view showing a hobbing machine in side elevation and the enclosure in section.

Referring to the drawings more in detail, there is shown a hobbing machine, at 10, mounted on a floor 11. The machine is arranged in a room, chamber or enclosure, at 12, preferably of cubicle shape and formed by the floor, vertical side walls 14 and 15, end walls 16 and 17 and a roof or cover 18 consisting of removable sections 19, the walls and cover preferably being made of suitable heat-insulating material.

The hobbing machine, at 10, includes a frame comprising a bedplate 20 having a vertically-extending headstock column structure 21 connected to one end thereof. The bedplate has a slide 22 mounted thereon and guided for movement toward and away from the headstock column structure 21 and carrying the turntable 23 for the gear blank 24.

The headstock column structure 21 supports a hob 25 for cutting gear teeth 26 on the blank, the hob being driven in the customary way. With the slide 22 adjusted to bring the blank 24 and the hob into desired relation, the hob and the turntable are given concurrent movements in the usual way to secure a generating cutting action, the turntable being rotated by means of worm gearing including a worm, (not shown) arranged in the housing 27 and driven by the shaft 28. With the hobber adjusted to the desired angle by the worm 29, the hob is rotated about its axis in the usual way and it is raised and lowered by means of the feed screw 30.

From the structure so far described, it will be seen that, over prolonged periods of cutting, errors will be introduced due to temperature changes. Expansion and contraction effects resulting in errors would occur, not only on account of the relatively large structure of the machine, the substantial extent thereof in three dimensions and particularly substantial vertical and horizontal structural portions, and the mounting of blank on the horizontal part of the machine and the hobber on the vertical part thereof, but the feed screw for the hobber, being exposed and dimensionally smaller and having smaller mass than other parts would be subject to more rapid temperature changes and consequent differential expansion and contraction effects. These expansion and contraction effects cause departure of the hob from its intended position relative to the blank, in consequence of which errors in cutting are introduced. An increase in temperature causes the hob and the blank to move toward each other and a decrease has the contrary effect, while changes in temperature of the feed screw upset the intended relation of the hobber with respect to the gear face.

In order to avoid temperature changes of the hobber and the blank with the effects just pointed out, in accordance with my invention, the hobbing machine is mounted in the room, chamber or enclosure 12, as already described, and heating means, at 32, and cooling means, at 33, are arranged within the enclosure for keeping the air therein within a narrow range of temperature variation and to minimize temperature variation throughout the volume thereof.

The heater and the cooler, at 32 and 33, respectively, are preferably arranged adjacent, near to the floor 11 and in one corner of the room or enclosure, the adjacent heater and cooler being regarded as a heating and cooling set. While a single set may be used for the purpose of controlling the temperature of air within the enclosure, as shown, I prefer to employ two sets located at diagonally opposite corners of the enclosure.

Both the heater and the cooler are arranged to have air of the enclosure pass therethrough to effect transfer of heat thereto or therefrom, air flow being produced by motor-operated fans. To this end, the heater, at 32, preferably including an electric heating element 34, is provided with a fan 35 driven by motor 36, and the air cooler, at 33, which is preferably of the conventional refrigerator type, has a fan 37 driven by a motor 38.

The heater and cooler fans 35 and 37 are arranged to discharge air out of contact with the machine and in such manner as to promote approach to a uniform temperature condition of air throughout the volume of the enclosure, keeping the discharge away from the machine so far as possible preventing the latter from being subject to differential temperature conditions and promotion of a uniform temperature throughout the enclosure volume assuring that the machine will be subject to such a temperature throughout its extent.

Avoidance of impingement of discharging air on the machine is secured by the provision of an enclosure affording space between the walls thereof and the machine and the location of the heater and cooler fans so as to discharge air between the enclosure walls and the machine. For example, the heater and cooler sets are arranged in corners with the heater fan discharging horizontally across the chamber between an end wall and the machine and with the cooler fan discharging upwardly between the wall and the machine.

Figure 3:
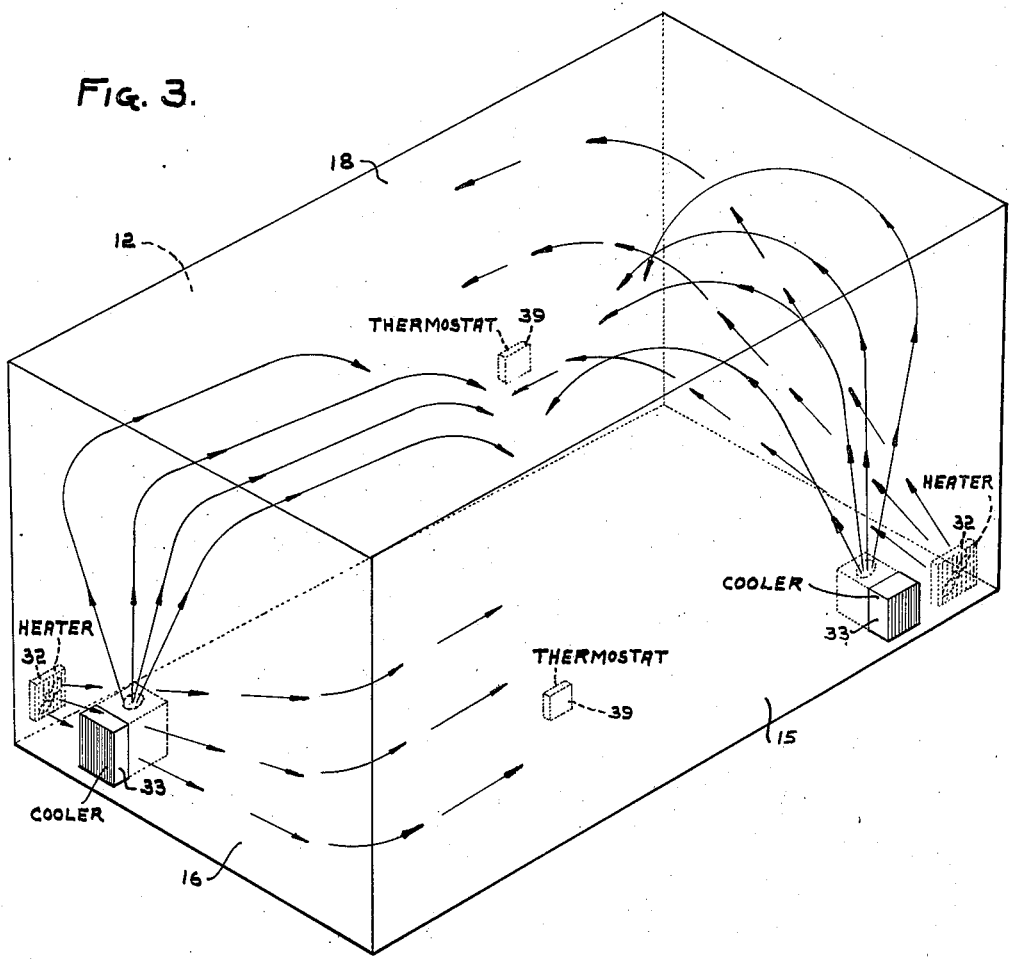
Fig. 3 is an isometric diagram of the enclosure and the heating and cooling means; and, Fig. 4 shows a control diagram for the heater and cooler.

Promotion of approach to a more uniform temperature condition throughout the enclosure volume is secured by having the heater fan discharge horizontally and near to the floor and by having the cooler fan discharge upwardly. (See Fig. 3.) As heated air tends to rise and cool air to fall, unless measures to the contrary were taken, the temperature would vary from the floor to the ceiling, being a maximum at the ceiling and minimum at the floor. As the cooler fan 37 discharges air upwardly for flow along the ceiling, it is assured that the accumulations of warm air in the upper portion of the enclosure are swept downwardly. Likewise, the warm air blasts from the heater sweeps cool air accumulations from the lower portion of the enclosure upwardly. The tendency of the warm air in the lower portion of the enclousure to ascend and that of the cool air in the upper portion of the enclosure to descend, promotes mixture thereof and the production of an average temperature condition throughout the volume which approaches uniformity.

Preferably, with a cubicle type of enclosure, heater and cooler sets are arranged in diagonal corners so as to provide for substantially circuitous encompassment of the machine by discharging heated air, thereby providing for effective sweeping of any cool air accumulations from thereabout.

Each heater and cooler set must be controlled so as to keep the air within the desired narrow temperature range. Accordingly, each set has a thermostat 39 associated therewith, the thermostat operating, in case of decline of temperature to a predetermined point to interrupt operation of the cooler and to start operation of the heater, the reverse operation being secured thereby in case the temperature rises to a predetermined point.

Figure 2:
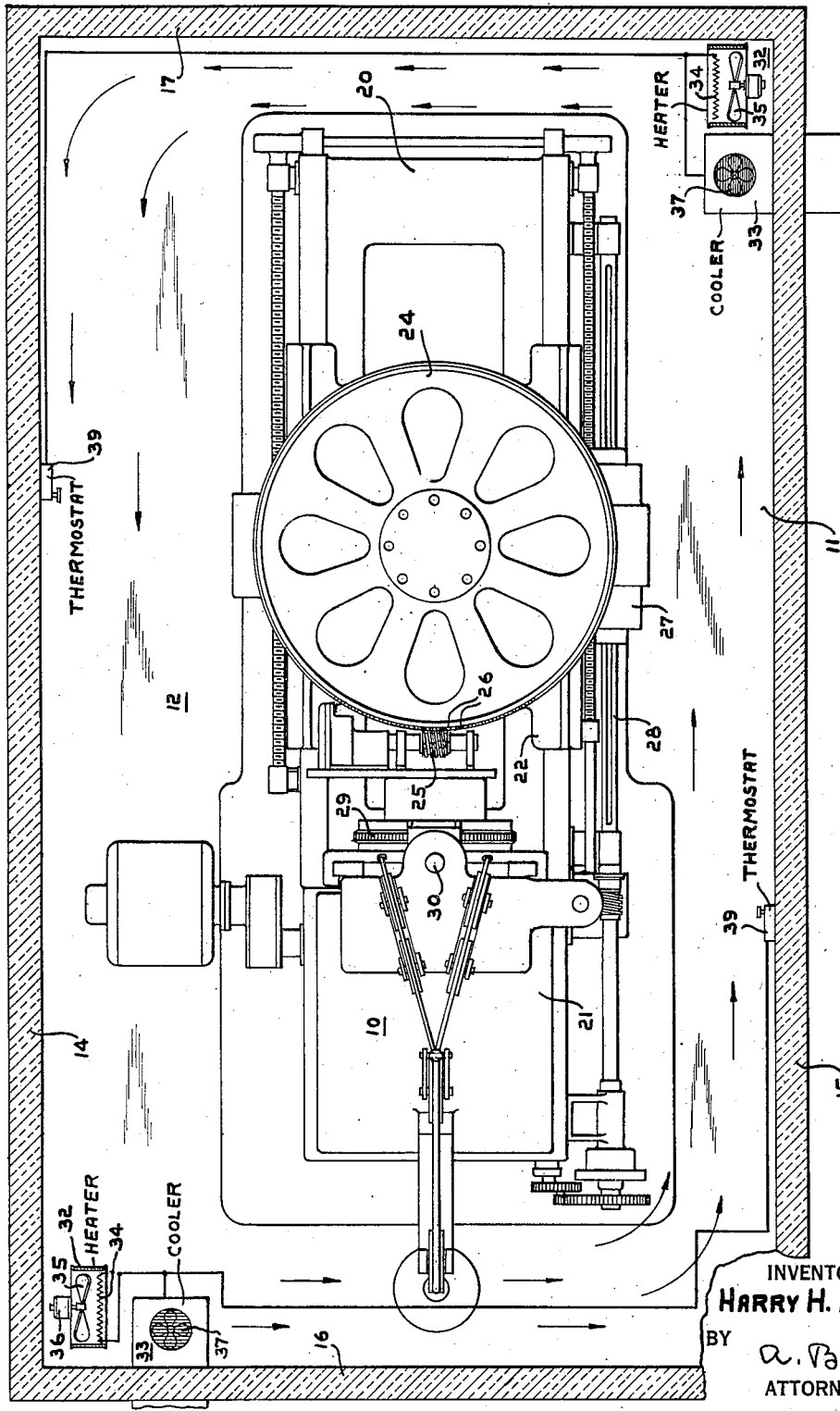
Fig. 2 is a view showing the hobbing machine in plane and its enclosure in horizontal section.

It is desirable that heating be accomplished in an incremental manner, that is, instead of depending upon the entire volume of air within the enclosure reaching the predetermined maximum temperature before stopping the heater fan, such fan is stopped after a portion of the air reaches the desired temperature, the heated portion of the air rising and mixing with the cooler air descending from the ceiling, and, if the temperature is still too low, the heater is again started, the heater being operated in this step-by-step manner until the desired temperature is reached. This operation is easily provided for by suitable location of the thermostats 39. Accordingly, each thermostat is carried by an enclosure wall across the enclosure from its heater, at about the height of the blank and sufficiently in the path of discharging air as to be effected thereby but not too close to the heater. For example, in Fig. 2, each thermostat is carried by a side wall and arranged at a suitable distance around the corner from the end wall adjacent to its set. With this arrangement, the blast of heated air will travel horizontally between one end of the machine and an end wall, being deflected around the corner and then reaching the thermostat, the blast being dispersed and diffused as it travels along with the result that a desired volume of heated air in the enclosure may be had before the thermostat is operated to interrupt the heater fan.

Figure 4:
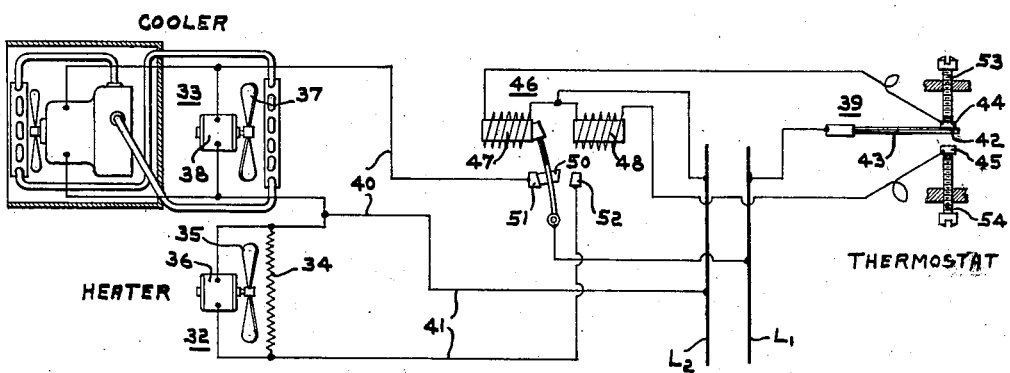

In Fig. 4, there is shown a heater and a cooler set together with the controlling thermostat. The fan motors 36 and 38 of the heater and of the cooler, respectively, are supplied with current from the line L₁, L₂ by means of circuits 40 and 41 under the control of the thermostat 39. The thermostat includes the usual intermediate contact 42 carried by an element 43, which moves in response to change in temperature, and outer contacts 44 and 45, the arrangement being such that, when the intermediate contact 42 engages the contact 44, the circuit 41 is opened and the circuit 40 is closed, and, when it engages the contact 45, the circuit 40 is opened and the circuit 41 is closed. Preferably, the thermostat includes a relay, at 46, to effect opening and closing of the circuits, the relay including electro-magnets 47 and 48 energized when the contact 42 engages the contacts 44 and 45, respectively, to effect movement of the intermediate contact 50 to engage the outer contacts 51 and 52 in the circuits 40 and 41, respectively.

With this control arrangement, it will be apparent that, when the circuit 40 is closed, the circuit 41 is opened, and vice versa, with the result that, when the cooler fan 37 is in operation, the heater fan 35 is idle and vice versa. As the temperature of air within the enclosure declines to a predetermined point, the contact 42 will engage the contact 45 to close the circuit 41, thereby placing the heater in operation, the roller fan 37 being rendered idle by opening of the circuit 40; and, when the temperature of the air within the enclosure reaches the upper limit, the contact 42 engages the contact 44 to close the circuit 40 to place the cooler fan 37 in operation, the circuit 41 then being open to stop the heater fan 35. Preferably, the contacts 44 and 45 are carried by screws 53 and 54, respectively, so that suitably narrow temperature range may be provided, for example, ¾° F. While the thermostat, at 39, may be arranged to operate to close and open the circuits 40 and 41 directly, preferably the relay, at 46, is interposed, to assure of continuity of operation of the fan motors, the heater fan being idle while the cooler fan is in operation and vice versa. The advantages of continuity of operation, direction of fan discharge, and the turbulence effect of the fans are not only to keep the temperature within the enclosure within a narrow range of variation throughout the volume, but to secure such frequency of change of temperature of the air within the range that negligible temperature change of the machine and blank occurs.

As heat inertia of the hobbing machine with the blank carried thereby is relatively large compared with that of the volume of air within the enclosure, it will be apparent that the temperature of the air may be changed relatively more rapidly than that of the machine and the blank, that is, for the same quantitative heat change of the machine and of the air, the change of temperature of the air is large in comparison to that of the machine with the result that negligible change in temperature of the latter occurs during change of temperature of air within the regulating range. Accordingly, the control of the means for abstracting heat from or adding heat to the air to keep the temperature of the latter within a narrow range is accompanied by negligibly small change in temperature of the machine while the temperature of the air changes with sufficient frequency through the regulating range. For example, during the time that the air changes for the full range, say ¾° F., the machine may change $\frac{1}{50}$° F. In connection with the time factor, it is, therefore, desirable to avoid relatively long time intervals for the air to change from one limit to the other. As already pointed out, daily temperature changes during the time required for finish-cutting are productive of errors in the gear; and, even though the range of temperature change may be reduced by the provision of heating and cooling means, it is, nevertheless, desirable that the air temperature shall change through such small range during an interval which is relatively short compared to that required for the machine to change through the same range. Instead of a heating and cooling arrangement where the temperature is allowed to rise or fall gradually, applicant has an active arrangement where either the cooler or the heater is in operation, whereby the temperature of air within the enclosure is caused to move through the regulating range with such a degree of rapidity that negligible change in temperature of the machine occurs during the time that the air changes in temperature from one limit to the other of the regulating range. Furthermore, the objective of minimizing temperature variations throughout the volume of the enclosure is better accomplished by the active system of control where the heater and cooler operate alternately, for, with one or the other of these devices in operation during the finish-cutting period, it is assured that air discharged from the heater and the cooler in the manner hereinbefore pointed out will promote, due to agitation and turbulence caused by the fans and by the natural flow tendency of the air incident to placing the cool air adjacent to the ceiling and the warm air adjacent to the floor, avoidance of stratification and results in a minimum temperature variation throughout the volume of the enclosure, these results obviously being better effected by the relatively high frequency of temperature change of the air brought about by having the heater and the cooler alternately and continuously in operation during the finish-cutting period. Agitation and turbulence of the air due to one fan or the other coupled with discharge of cool and warm air to portions of the enclosure contrary to portions thereof which such air would naturally occupy under the influence of gravity avoids stratification and localized bodies of air at different temperatures. With the directions and velocity energy imparted thereto by the fans, the cool air sweeps out any accumulations of warm air at the ceiling and the warm air sweeps out any accumulations of cool air at the floor, and the warm air then rises and cool air falls with the result that the air is kept at a more uniform temperature throughout the volume of the enclosure. In this connection, it should be noted that a static or quiescent condition is avoided, turbulent air flow in this manner being continuous. Furthermore, the thermostat does not respond to the temperature of an air stratum with higher temperatures above and lower temperatures below, but more nearly to an average condition throughout the enclosure, such average temperature condition not being one which is fixed but one which hunts to and fro within the regulating range. Thus it will be seen that, although the machine may be relatively large and have substantial height, length and width dimensions, the more uniform temperature conditions of air throughout the enclosure minimize any differential contraction and expansion effects and the high frequency of temperature change within the regulating range reduces the temperature change of the machine and its blank to a negligible extent.

While the apparatus described is particularly useful in connection with gear cutting machines, it will be apparent that it may be used with any other machine where like problems arise. Furthermore, the enclosure with warm air supplied to the bottom and cool air to the top alternately, and with a thermostat in the warm air path may be used in any situation where a substantially uniform temperature condition throughout the volume of the enclosure is desired.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In apparatus for maintaining a gear hobber and a gear blank within a very narrow range of temperature variation during finish cutting of the blank irrespective of atmospheric temperature changes, an enclosure for the machine and the blank, first means for heating air within the enclosure, second means for cooling air within the enclosure, and means responsive to increase in temperature of air within the enclosure to a predetermined point to render the first means ineffective and the second means effective and to decrease in temperature to a predetermined point to render the second means ineffective and the first means effective.

2. In apparatus for maintaining a gear hobber and a gear blank within a very narrow range of temperature variation during finish cutting of the blank irrespective of atmospheric temperature changes, an enclosure for the machine and the blank, first means for supplying heated air to the lower portion of the enclosure, second means for supplying cooled air to the upper portion of the enclosure, and means responsive to air temperature within the enclosure to control said first and second means so as to keep the enclosure air temperature within a predetermined range.

3. In apparatus for maintaining a gear hobber and a gear blank within a very narrow range of temperature variation during finish cutting of the blank irrespective of atmospheric temperature changes, an enclosure for the machine and the blank, heating means for air within the enclosure and including a fan for discharging a blast of heated air horizontally in the lower portion of the enclosure, cooling means for air within the enclosure and including a fan for discharging a blast of cooled air into the upper portion of the enclosure, and means responsive to increase in enclosed air temperature to a predetermined point to render the heater ineffective and the cooler effective and to decrease in temperature to a predetermined point to render the cooler ineffective and the heater effective.

HARRY H. BATES.